United States Patent

Katayama et al.

[11] Patent Number: 5,612,591
[45] Date of Patent: Mar. 18, 1997

[54] ELECTROLUMINESCENT DEVICE

[75] Inventors: Masayuki Katayama, Handa; Akira Kato, Kariya; Nobuei Ito, Chiryu; Tadashi Hattori, Okazaki, all of Japan

[73] Assignee: Nippondenso Co., Ltd., Kariya, Japan

[21] Appl. No.: 366,420

[22] Filed: Dec. 29, 1994

[51] Int. Cl.$^6$ .................................................. H01J 1/63
[52] U.S. Cl. .......................... 313/503; 313/506; 428/917
[58] Field of Search ................... 313/503, 468, 313/506, 509, 512; 428/917; 315/169.3

[56] References Cited

U.S. PATENT DOCUMENTS

| | | | |
|---|---|---|---|
| 4,751,427 | 6/1988 | Barrow et al. | 313/503 |
| 5,309,070 | 5/1994 | Sun et al. | 313/503 |
| 5,444,268 | 8/1995 | Miyakoshi et al. | 313/503 X |

FOREIGN PATENT DOCUMENTS

| | | |
|---|---|---|
| 60-39311 | 9/1985 | Japan. |
| 5-65478 | 3/1993 | Japan. |

OTHER PUBLICATIONS

1978 SID International Symposium Digest of Technical Papers, Apr. 1978.
Journal of the Society of Japan, vol. 48, No. 4, Apr. 1980, Teruhiko Hoshina pp. 158–165.

J. Electrochem, Soc.: Solid–State Science and Technology, Feb. 1972 T. E. Peters et al, pp. 230–236.

SID 93 Digest 1993 32.1: A New Class of Blue TFEL Phosphors with Application to a VGA Full–Color Display W.A. Barrow et al, pp. 761–764.

SID 86 Digest 1986 4.2: Red and Blue Electroluminescence in Alkaline–Earth Sulfide Thin–Film Devices Shosaku Tanaka et al, pp. 29–32.

*Primary Examiner*—Sandra L. O'Shea
*Assistant Examiner*—Ashok Patel
*Attorney, Agent, or Firm*—Cushman, Darby & Cushman IP Group of Pillsbury Madison & Sutro LLP

[57] ABSTRACT

An electroluminescent device comprising the sequential lamination of a first electrode, first insulating layer, phosphor layer, second insulating layer and second electrode while using an optically transparent material at least on the side on which light leaves the device; wherein, in addition to the phosphor layer being composed of calcium thiogallate ($CaGa_2S_4$) doped with a luminescent center element, the host of the phosphor layer is strongly oriented to the (400) surface.

5 Claims, 4 Drawing Sheets

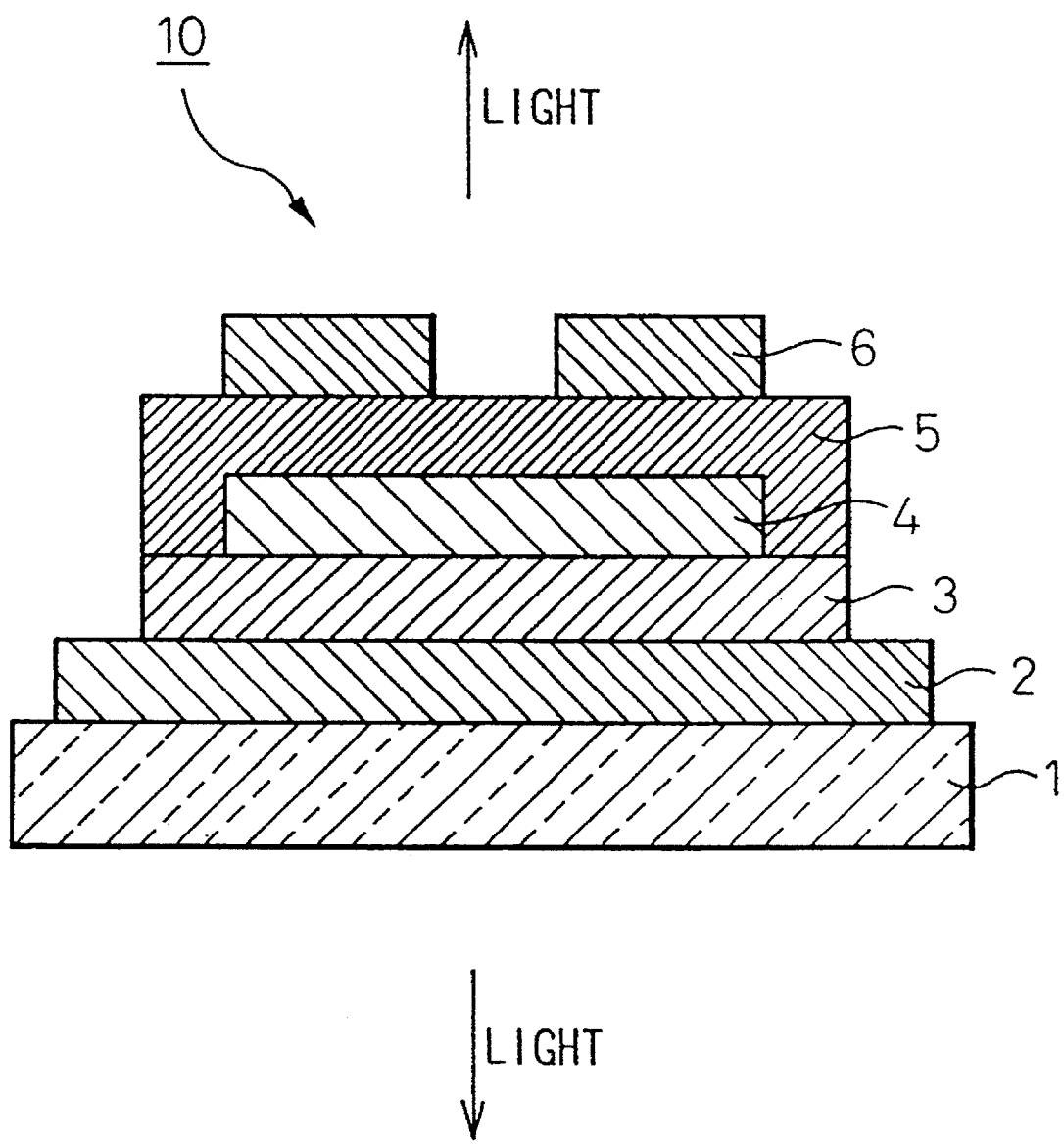

ELECTROLUMINESCENT DEVICE

BACKGROUND OF THE INVENTION

1. Field of the Invention

The present invention relates to an electroluminescent device (EL device) that is used, for example, in the emissive displays of instruments or in the displays of various information terminal equipment.

2. Description of the Related Art

Conventionally, EL devices utilize a phenomenon in which light is emitted when an electrical field is applied to a fluorescent material such as zinc sulfide (ZnS). They are attracting attention as devices that compose self-illuminating type flat displays.

FIG. 5 is a schematic diagram indicating the typical cross-sectional structure of conventional EL device 10.

EL device 10 is formed by sequentially laminating a first electrode 2, composed of an optically transparent ITO (indium tin oxide) film, a first insulating layer 3, composed of tantalic pentoxide ($Ta_2O_5$) and so forth, a phosphor layer 4, a second insulating layer 5, and a second electrode 6, composed of an ITO film, on an insulated substrate in the form of glass substrate 1.

ITO films are transparent and conductive films wherein tin (Sn) is doped onto indium oxide ($In_2O_5$), and have been widely used for transparent electrodes due to their low resistivity.

Examples of phosphor layer 4 include those in which zinc sulfide (ZnS) is used for the host, which is doped with manganese (Mn) or terbium (Tb) as the luminescent center, as well as those in which strontium sulfide (SrS) is used for the host, which is doped with cerium (Ce) as the luminescent center.

The emitted colors of EL devices are determined by the type of dopant in the zinc sulfide. For example, in the case of doping with manganese (Mn) as the luminescent center, yellow-orange light is emitted, while in the case of doping with terbium (Tb), green light is emitted. In addition, in the case strontium sulfide (SrS) is doped with cerium (Ce) as the luminescent center, blue-green light is emitted.

In order to realize full-color EL displays, it is necessary to form an EL phosphor layer that emits red, green and blue light. Examples of phosphor layer materials of EL devices that emit blue color typically include those in which strontium sulfide (SrS) is doped with cerium (Ce) as the luminescent center.

However, in the case of using this phosphor layer material, since this material inherently emits blue-green light, in order to obtain only blue light, it is necessary to use a filter that cuts the green component of the emission spectrum as is indicated on p. 29–32 of Society of Information Display (SID) 86 Digest.

In addition, as is indicated on, for example, p. 761–764 of Society of Information Display (SID) 93 Digest, EL devices, wherein alkaline earth metal thiogallates ($MGa_2S_4$ M=Ca, Sr, Ba) are used for the host and then doped with cerium (Ce) as the luminescent center, are known to allow emission of blue light to be obtained without using a filter.

However, since the phosphor layer of alkaline earth metal thiogallates doped with cerium ($MGa_2S_4$: Ce, M=Ca, Sr, Ba) are formed by sputtering, a thin film having good crystallinity were unable to be obtained in the past. Consequently, heat treatment is necessary at a temperature of at least 650° C. at which softening of the glass substrate occurs in order to improve crystallinity of the phosphor layer following formation of the phosphor layer thin film.

However, when heat treatment at this temperature is performed, warping of the glass substrate is unable to be avoided, thus creating a major problem in terms of the structure of the blue EL device.

In addition, in blue EL devices on which this heat treatment has been performed, such devices conventionally have not been able to demonstrate a practically sufficient luminance. Although there are many factors regarding the relationship the crystallinity of the phosphor layer thin film and EL luminance that remain unclear, this is considered to be caused by being unable to obtain a means for obtaining high luminance.

SUMMARY OF THE INVENTION

The present invention was developed in order to solve the above-mentioned problems, and its object is to provide, with good reproducibility, an EL device having favorable blue light emission and a sufficient luminance without using a filter.

In order to solve the above-mentioned problems, the present invention provides an electroluminescent device comprising the sequential lamination of a first electrode, first insulating layer, phosphor layer, second insulating layer and second electrode while using an optically transparent material at least on the side on which light leaves the device; wherein, in addition to said phosphor layer being composed of calcium thiogallate ($CaGa_2S_4$) doped with an emission center element, the host of said phosphor layer is strongly oriented to the (400) surface.

BRIEF DESCRIPTION OF THE DRAWINGS

FIG. 5 is a schematic drawing showing the vertical cross-section of an electroluminescence device of the prior art.

DESCRIPTION OF THE PREFERRED EMBODIMENTS

In the above-mentioned electroluminescence device of the present invention, the X-ray diffraction intensity ratio between the (400) surface and (422) surface of the host material of the above-mentioned phosphor layer, namely I(400)/I(422), is preferably greater than 4.

In addition, the above-mentioned luminescent center element is preferably cerium (Ce) or europium (Eu).

Namely, in the phosphor layer composed of calcium thiogallate ($CaGa_2S_4$) doped with a luminescent center element in the present invention, since the host of the phosphor layer is strongly oriented to the (400) surface, and preferably, the X-ray diffraction intensity ratio between the (400) surface and (422) surface, namely I(400)/I(422), is greater than 4, the crystallinity of the phosphor layer can be remarkably improved.

Therefore, the concentration of non-radiative recombination centers, which are harmful to EL emission of light, can be remarkably decreased. In addition, since scattering of the carrier which travels in the phosphor layer is also reduced, the carrier can be easily accelerated to high energy. As a result, by using the present invention, EL luminance is remarkably improved even for devices emitting blue light for which adequate luminance was unable to be practically obtained in the past.

In the present invention, as a result of employing the above-mentioned means, a favorable blue light emitting EL device, having adequate luminance, can be provided with good reproducibility.

Figure 1:
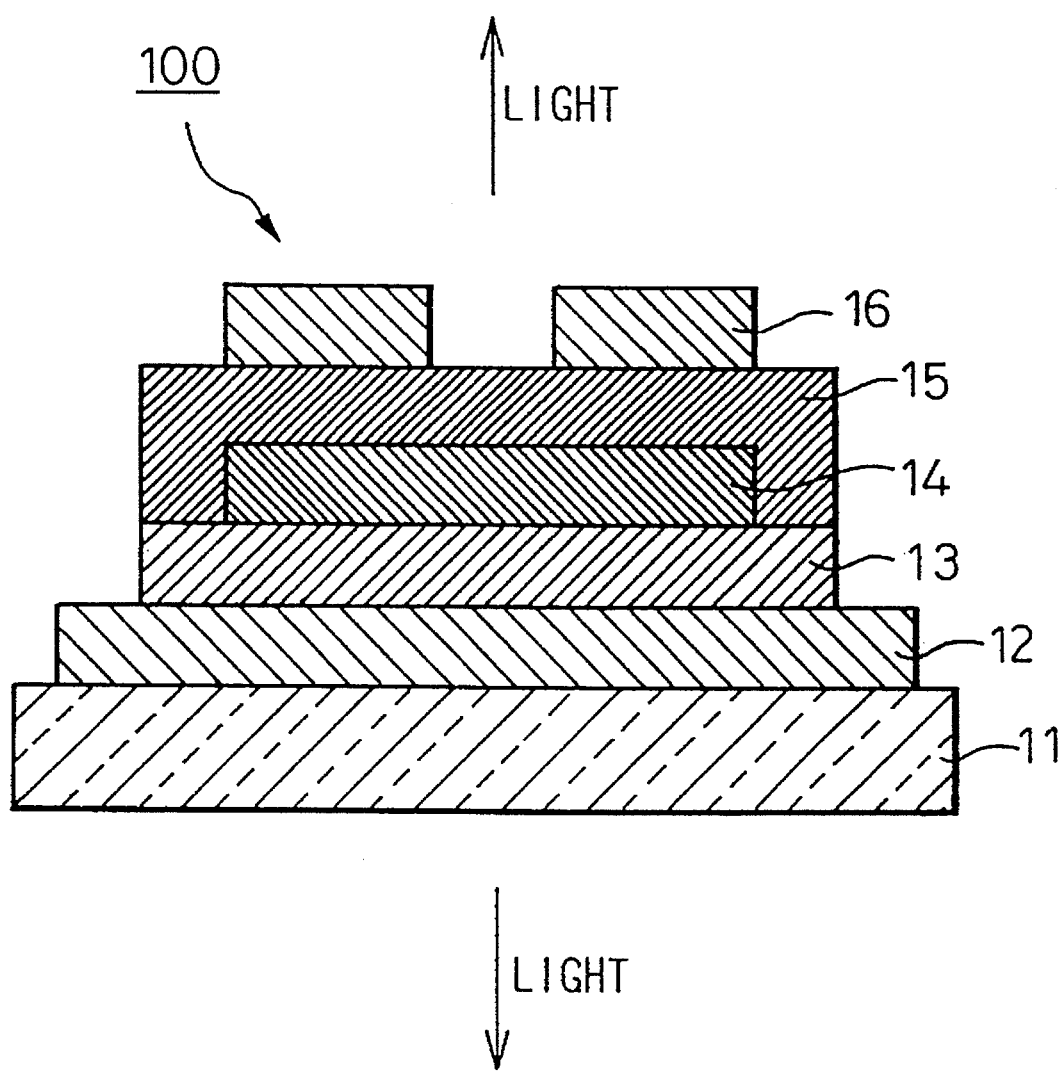
FIG. 1 is a schematic drawing indicating a vertical cross-section of an electroluminescent device as claimed in a first specific embodiment of the present invention.

The following provides an explanation of the present invention based on a specific embodiment. FIG. 1 is a schematic drawing indicating a cross-section of EL device 100 as claimed in the present invention. Furthermore, in EL device 100 shown in FIG. 1, light leaves the device in the directions of the arrows.

Thin film EL device 100 is composed by laminating and forming the following thin films sequentially on an insulated substrate in the form of glass substrate 11. Furthermore, the thickness of each of the layers described below is indicated in terms of the thickness at their central portions.

A first transparent electrode (first electrode) 12, composed of optically transparent zinc oxide (ZnO), is formed on glass substrate 11, and a first insulating layer 13, composed of optically transparent tantalic pentoxide ($Ta_2O_5$), a phosphor layer 14, composed of calcium thiogallate ($CaGa_2S_4$) doped with cerium (Ce) as the luminescent center, a second insulating layer 15, composed of optically transparent tantalic pentoxide ($Ta_2O_5$), and a second transparent electrode (second electrode) 16, composed of optically transparent zinc oxide (ZnO), are formed on the upper surface of said first transparent electrode 16.

Next, the following provides a description of a process for manufacturing the above-mentioned thin film EL device 100.

First, a first transparent electrode 12 was formed on glass substrate 11. A mixture of gallium oxide ($Ga_2O_3$) added to zinc oxide (ZnO) powder formed into pellets was used for the deposition material.

In addition, an ion plating apparatus was used for the deposition apparatus.

More specifically, the air inside the ion plating apparatus was exhausted to create a vacuum while maintaining the temperature of the above-mentioned glass substrate 11 at a constant temperature. Next, argon (Ar) gas was introduced after which beam power and radio frequency power were regulated so that deposition rate was within a range of 6–18 nm/min while maintaining a constant pressure.

Next, a first insulating layer 13, composed of tantalic pentoxide ($Ta_2O_5$), was formed by sputtering on the above-mentioned first transparent electrode 12.

More specifically, a mixed gas of argon (Ar) and oxygen ($O_2$) was introduced into the sputtering apparatus while maintaining the temperature of the above-mentioned glass substrate 11 at a constant temperature followed by deposition at radio frequency power of 1 KW.

Calcium thiogallate doped with cerium ($CaGa_2S_4$:Ce) phosphor layer 14, wherein calcium thiogallate ($CaGa_2S_4$) as the host is doped with cerium (Ce) as the luminescent center, was formed on the above-mentioned first insulating layer 13 by metal organic chemical vapor deposition (MOCVD).

More specifically, after reducing the pressure of the atmosphere within the deposition chamber while maintaining the temperature of the above-mentioned glass substrate constant at 500° C., calcium dipivaloyl methane ($Ca(C_{11}H_2O_2)_2$) using hydrogen ($H_2$) for the carrier gas, trimethyl gallium ($Ga(CH_3)_3$) also using hydrogen ($H_2$) carrier gas, or hydrogen sulfide ($H_2S$) diluted with hydrogen ($H_2$) gas was introduced into the deposition chamber. Moreover, in order to dope with the luminescent center element, cerium dipivaloyl methane ($Ce(C_{11}O_2O_2)_2$) was evaporated in the hydrogen ($H_2$) carrier gas and supplied into the deposition chamber. By then reacting and thermally decomposing these raw material gases, phosphor layer 14 was formed composed of calcium thiogallate ($CaGa_2S_4$) doped with cerium (Ce) as the luminescent center.

Next, a second insulating layer 15, composed of tantalic pentoxide ($Ta_2O_5$), was formed on the above-mentioned phosphor layer 14 using the same process as the above-mentioned first insulating layer 13. A second transparent electrode 16, composed of a zinc oxide (ZnO) film, was formed on a second insulating layer 15 using the same process as the above-mentioned first transparent electrode 12.

The film thicknesses are 300 nm for the first and second transparent electrodes 12 and 16, 400 nm for the first and second insulating layers 13 and 15, and 600 nm for phosphor layer 14.

Figure 2:
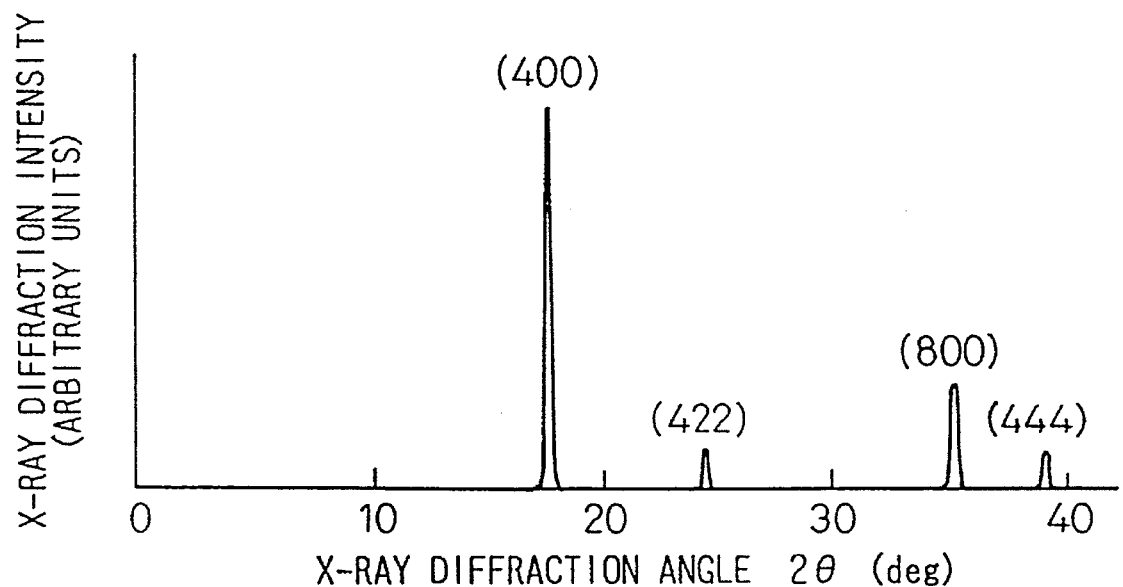
FIG. 2 is a graph indicating the properties of the X-ray diffraction spectrum of the phosphor layer thin film of the electroluminescent device as claimed in the embodiment shown in FIG. 1.
Figure 3:
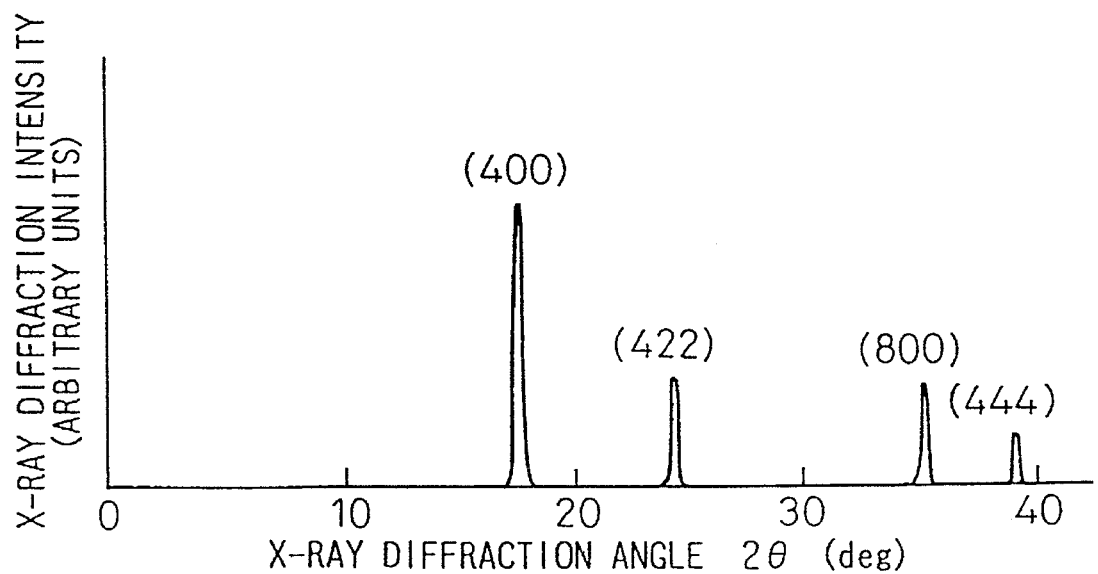
FIG. 3 is a graph indicating the properties of the X-ray diffraction spectrum of the phosphor layer thin film of a comparative article of the device of the embodiment shown in FIG. 1.

The X-ray diffraction spectra of phosphor layer 14 in an actual sample are shown in FIGS. 2 and 3. For the comparative sample (FIG. 3) in these graphs, the temperature of glass substrate 11 in the above-mentioned embodiment (FIG. 2) was maintained at 350° C.

As is shown in FIGS. 2 and 3, in a sample fabricated according to the present embodiment, the relative intensity of the diffraction peak of the (400) surface is larger than that of the comparative article, with orientation to the (400) surface being remarkably improved.

This indicates that the crystallinity of phosphor layer 14 composed of calcium thiogallate ($CaGa_2S_4$) doped with cerium (Ce) as the luminescent center has been remarkably improved in the sample fabricated according to the present embodiment.

Figure 4:
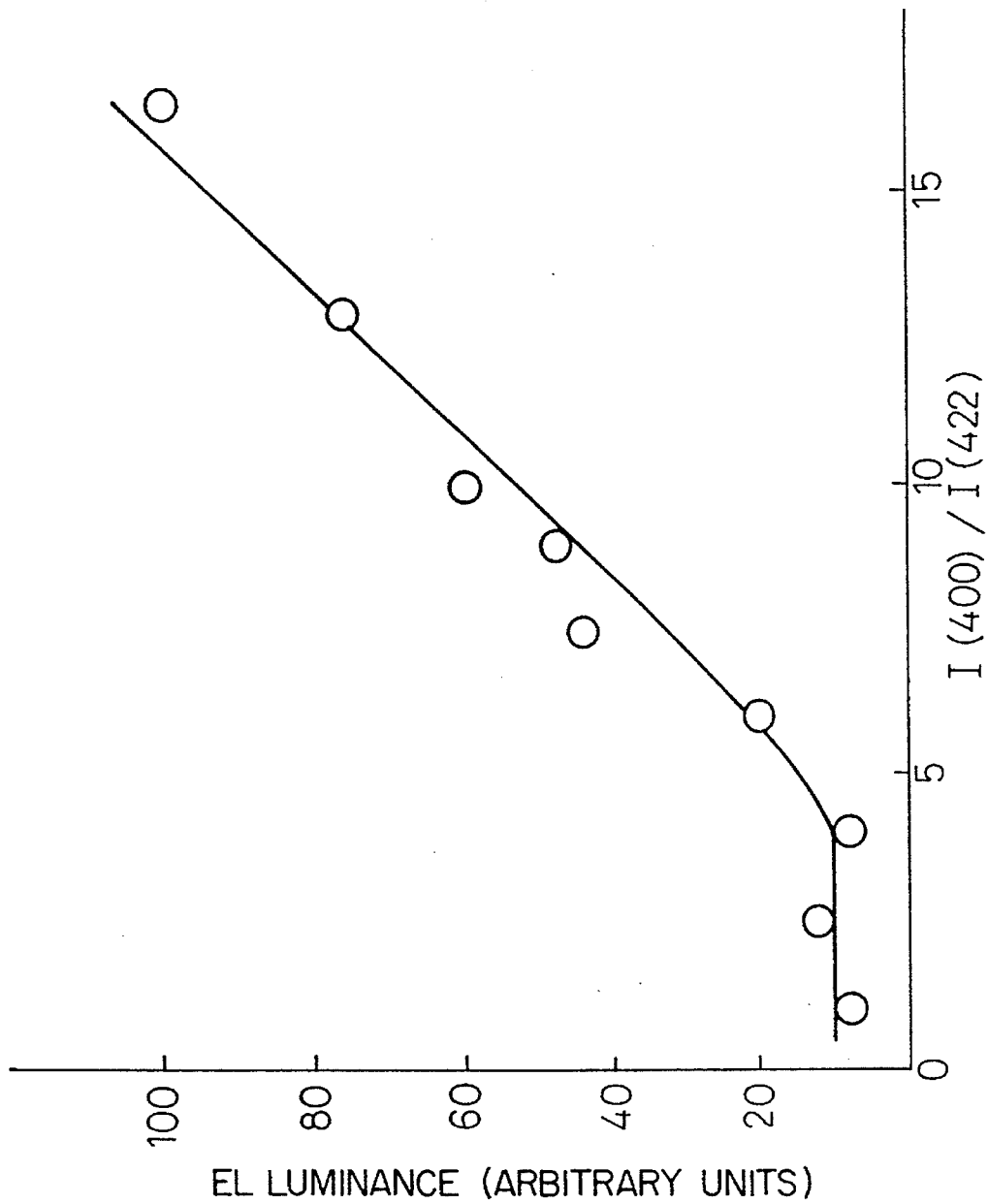
FIG. 4 is a graph indicating the properties of the X-ray diffraction intensity ratio between the (400) surface and (422) surface of the phosphor layer of the electroluminescence device of the embodiment shown in FIG. 1.

Next, FIG. 4 indicates the relationship between the X-ray diffraction intensity ratio between the (400) surface and (422) surface of phosphor layer 14 in an actual sample, namely I(400)/I(422), and luminance at an applied voltage 60 V over the emission threshold voltage.

In addition, the X-ray diffraction intensity ratio was changed by changing the substrate temperature during formation of the phosphor layer by MOCVD.

As shown in FIG. 3, when I(400)/I(422) was greater than 4, luminance increased remarkably.

Thus, since the crystallinity of phosphor layer 14 is remarkably improved by using the present invention, it is possible to realize an EL device having higher luminance than the process of the prior art.

We claim:

1. An electroluminescent device comprising:

first electrode;

first insulating layer on said first electrode;

phosphor layer on said first insulating layer, wherein said phosphor layer comprises a calcium thiogallate host which is doped with a luminescent center element and which has an x-ray diffraction intensity ratio $I(400)/I(422)$ greater than about four;

second insulating layer, on said phosphor layer; and second electrode on said second insulating layer.

2. An electroluminescent device according to claim 1, wherein said luminescent center element is cerium (Ce).

3. An electroluminescent device comprising:

a first electrode;

first insulating layer on said first electrode;

phosphor layer on said first insulating layer, wherein said phosphor layer comprises a calcium thiogallate host which is doped with a luminescent center element and which has an x-ray diffraction intensity ratio $I(400)/I(422)$ greater than about four, and said phosphor layer is grown by metal organic chemical vapor deposition;

second insulating layer on said phosphor layer; and second electrode on said second insulating layer.

4. An electroluminescent device comprising:

a transparent substrate;

first electrode on said transparent substrate;

first insulating layer on said first electrode;

a phosphor layer on said first insulating layer, wherein said phosphor layer comprises a calcium thiogallate host which is doped with a luminescent center element and which has an x-ray diffraction intensity ratio $I(400)/I(422)$ greater than about four, and said phosphor layer is grown by metal organic chemical vapor deposition while said transparent substrate is heated to a temperature equal to or greater than a prescribed temperature so that said x-ray diffraction intensity ratio is greater than about four;

second insulating layer on said phosphor layer; and second electrode on said second insulating layer.

5. An electroluminescent device according to claim 4, wherein said prescribed temperature is about 500° C.

* * * * *